(12) United States Patent
Mehta et al.

(10) Patent No.: US 8,346,614 B2
(45) Date of Patent: Jan. 1, 2013

(54) PROMOTING A WEB TECHNOLOGY THROUGH A VIRTUAL SERVICE MARKETPLACE

(75) Inventors: Manu Mehta, Fremont, CA (US); Lynn R. Slater, Jr., Fremont, CA (US)

(73) Assignee: Metabyte, Inc., Fremont, CA (US)

( * ) Notice: Subject to any disclaimer, the term of this patent is extended or adjusted under 35 U.S.C. 154(b) by 566 days.

(21) Appl. No.: 12/204,816

(22) Filed: Sep. 5, 2008

(65) Prior Publication Data
US 2009/0070235 A1 Mar. 12, 2009

Related U.S. Application Data

(60) Provisional application No. 60/967,636, filed on Sep. 6, 2007.

(51) Int. Cl.
*G06Q 30/00* (2006.01)
(52) U.S. Cl. ..... 705/26.1; 705/59; 705/36 R; 705/14.72; 705/37
(58) Field of Classification Search .................. None
See application file for complete search history.

(56) References Cited

U.S. PATENT DOCUMENTS

| | | | |
|---|---|---|---|
| 6,965,877 | B2 | 11/2005 | Banerjee et al. |
| 7,069,242 | B1 * | 6/2006 | Sheth et al. ..... 705/37 |
| 2002/0002523 | A1 * | 1/2002 | Kossovsky et al. ..... 705/36 |
| 2003/0028419 | A1 | 2/2003 | Monaghan |
| 2007/0260612 | A1 * | 11/2007 | Papakonstantinou et al. .. 707/10 |
| 2008/0010142 | A1 * | 1/2008 | O'Brien et al. ..... 705/14 |
| 2008/0066080 | A1 * | 3/2008 | Campbell ..... 719/314 |

FOREIGN PATENT DOCUMENTS
WO WO 2004104793 A2 * 12/2004

OTHER PUBLICATIONS

DevelopMentor Expands Channel Reseller Program With the Additon of UK-Based Grey Matter, by PRNewswire, published on Aug. 14, 2001.*

* cited by examiner

*Primary Examiner* — Luna Champagne
(74) *Attorney, Agent, or Firm* — Ash Tankha; Lipton, Weinberger & Husick

(57) ABSTRACT

Disclosed herein is a computer implemented method and system for promoting a web technology through a virtual service marketplace. Online tools are provided on a host website for creating a project website. The host website comprises the virtual service marketplace. A user defines a project and proposes the project to multiple consultants in the virtual service marketplace. The consultants bid for the proposed project in the virtual service marketplace. Core controlling factors set by the user during project definition are synchronized with core controlling factors set by the project consultant. The user selects a project consultant based on the synchronization. The selected project consultant creates the project website using the online tools. The user pays the selected project consultant for creating the project website. The presence of the virtual service marketplace promotes the web technology and the growth in numbers of users and consultants familiar with the web technology.

28 Claims, 48 Drawing Sheets

| Basic Site - $99 | Dynamic Site - $199 | Custom Project |
|---|---|---|
| May include interactive calendar, articles, photo gallery, etc. No website registrations, auto emails, product catalog or PayPal link.<br><br>- Up to 5 pages<br>- Up to 2 rounds of revisions<br>- 15 min. assistance or training (within 30 days)*<br>- Uses Basic Plan - $9.95/mo.<br><br>Register to start a project | May include interactive calendar, articles, photo gallery, website registrations, newsletter, discussion board, members-only pages, auto emails, time-sensitive content, rotating content, simple catalog or PayPal link.<br><br>- Up to 10 pages<br>- Up to 2 rounds of revisions<br>- 30 min. assistance or training (within 30 days)*<br>- Uses Dynamic Plan - $19.95/mo.<br><br>Register to start a project | Define the site you want with the tools you want at the budget you can afford.<br>Define a custom project and our PenPals will bid for your business.<br><br>- Monthly Plan depends on your site description.<br><br>Register to start a project |

FIG. 5

[username or email] ******* LOGIN

HotDoodle®
PEN FOR THE WEB

Register

Home  About  About 2  Do It With Help  Do It Yourself  Support

Free Session  About PenPals  Pre-Defined Projects

What's a PenPal?

PenPals are web-savvy individuals – either HotDoodle design team members or freelancers – who use Hot Doodle's web-based building blocks to help get you started, modify an existing site, or build you an existing site, or build you a brand new site.

| Describe what you need for your project | Submit your project for bidding | Review bids from PenPals and choose one! |

Help As You Need It

We have created a marketplace where you can come for whatever help you need. You can engage a Penpal anytime, and because HotDoodle is completely online and template-driven, any PenPal can pick up where another left off. There are no proprietary software or source files to worry about.

At HotDoodle, being dependent on a single webmaster who may be unreliable or unresponsive is a thing of the past. And no more worrying about expensive fees for minor site changes – you can do them yourself anytime!

See Pre-Defined Projects

Read Terms and Conditions of working with Penpals.

Interested in being a PenPal?

Link to section Be a PenPal

List Of PenPals

☐ Pay to register
☐ Paid or private areas (example: customer only pages)
☐ Visitors can edit
☐ Visitors can post
☐ Visitors or customers get editable customized profile page
☐ Simple selling
☐ Customers get customized emails upon purchase
☐ Customers get special site access upon purchase
☐ Product catalog Customer Supplied Elements
☐ Business descriptions
☐ Business specific pictures
☐ Other related pictures to add interest
☐ Product catalog
☐ Logo Information About my Project

| Arial | 2(10 pt) | B *I* U ≡ ≡ ≡ ≟ ≟ |

(You will be able to upload files after you save)

Operational Preferences

Work Location  ◉ Work will be done remotely
○ Must come on site now and then (may cost more)

Timeline  [14] Days from project start

Rate  Fixed ○  Rate: [$0]
Hourly ◉  Per Hour: [$25]

Payment Schedule
◉ Payment in Full after project is completed [?]
○ Payment in Full before project starts [?]
○ Progress Payments [?]
Progressive Payment Schedule [?]
[_____]

No matter when payments are to be transferred to the PenPal, some projects might require that some or all of the payment be placed in reserve before the project starts. This is a sign of good faith from the customer to the PenPal. [?]

[$0] Amount to be placed in reserve before the project starts

Responses
I plan to  ◉ Pick the first response that seems ok
○ Wait for the due date and then consider all responses
[September] [4] [2008]  Due Date

[Submit and Review]  [Cancel]

FIG. 9

Site Features -- These were set by the pre-defined project and cannot be changed ?

List of services
    Organization history
    Contact information
    List of relevant articles
    Testimonials
    Photo gallery
    Photo or work sample slideshow
    Calendar
    Visitors can post Customer Supplied Elements
    Business descriptions
    Business specific pictures
    Other related pictures to add interest
    Logo Information About my Project

[Arial] [2(10 pt)] B *I* U (You will be able to upload files after you save)

Operational Preferences

These are locked. You can set your own by defining a new project from scratch.

Work Location  Work will be done remotely

Timeline    7 days from project start. Remember that you must do your during this timeline.

Rate     $99.00 Fixed with all of it to be placed in reserve ?

Explain Reserve Amounts

Responses

I plan to
   ◉ Pick the first response that seems ok

○ Wait for the due date and then consider all responses

[September] [4] [2008] Due Date

[Submit and Review] [Cancel]

FIG. 11

Rates

Fixed ○   Rate: [$75.00]
Hourly ●   Per Hour: [$0]

Payment Schedule

○ Payment in Full after project is completed [?]

● Payment in Full before project starts [?]

○ Progress Payments [?]

Progressive Payment Schedule [?]
[                                              ]

No matter when payments are to be transferred to the PenPal, some projects might require that some or all of the payment be placed in reserve before the project starts. This is a sign of good faith from the customer to the PenPal. [?]

[$50.00] Amount Customer *must* place in reserve before accepting your bid

This bid expires [September] [4] [2008]

Important: HotDoodle was founded on the premise that customers and PenPals can achieve amazing results when there is a shared spirit of good faith and open communication. As an authorized PenPal, you are expected to complete a project if you submit a bid and it is accepted by the customer before the expiration date.

However, we realize that special circumstances could arise that could impact your ability to undertake the project, thus you have a final opportunity to decline the project when you are asked for final confirmation.

Please be aware that declining an accepted bid is posted on your PenPal profile, and the declined customer could possibly post comments on your profile as well. Your profile could eventually discourage future customers from accepting your bids if you establish a history of not following through on projects that you committed to past customers.

Hot Tip: Can't I bid on several projects in the hopes that I win one? [?]

[Submit and Review]   [Cancel]

FIG. 17

 Add Topic

No topics were found.

Winning Bid:

Other Bids:

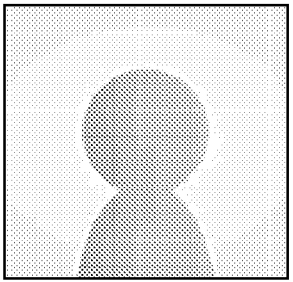

penpal5 5

I'm super dull                                    Rank: 0
                                                  Hourly: $0.00
$99.00 Fixed
Payment: Work First, $99.00 reserved
Bid Expires: 09/04/08

Website for patent discussions

[Accept this bid and reject all others]   [Reject this bid]

Vivek Rau

Membership Sites                              Rank: 3
                                                  Feedback: *****
$75.00 Fixed                                      Profile: Freelancer
Payment: Pay First,                               Location: Palo Alto,
        $50.00 reserved                           CA, 94536
Timeline: 21 days                                 Hourly: $75.00
Bid Expires: 09/04/08

Different Fixed Price, Timeline, Payment Plan, Reserve

Website for patent discussions
Site will be limited to discussion boards only.

[Accept this bid and reject all others]   [Reject this bid]

[Back]

FIG. 18

ACCEPT THE PENPALS'S TERMS

This is your chance to accept a bid on this project.

However there are differences between what is offered in this bid and what you requested in your project description.

We encourage you to contact the PenPal if you have any questions about the bid, or to resolve any differences between what is offered in this bid and what you requested in your description. This will also give you a sense of how well you two can work together.

You have two means of contacting the PenPal
- Post a question to the project form. Your question will be visible to all PenPals. Add Question
- Ask the PenPal a private question. Your personal contact information will be provided so the PenPal can get in touch with you privately either by phone or email.
  Ask a Private Question

You must accept these changes in your project in order to accept this bid.

| | | |
|---|---|---|
| Fixed Price | ☑ | I accept changing this in my project from $99.00 to $75.00 |
| Timeline | ☑ | I accept changing this in my project from 7 days to 21 days |
| Payment Plan | ☐ | I accept changing this in my project from Work First to Pay First |
| Reserve | ☐ | I accept changing this in my project from $99.00 to $0.00 |

Accept these changes to my project    Cancel Accepting the bid

FIG. 19

BID ACCEPTANCE CONFIRMATION

Winning Bid:

Vivek Rau

Membership Sites $75.00 Fixed
Payment: Pay First,
$50.00 reserved
Bid Expires: 09/04/08

Website for patent discussions

Site will be limited to discussion boards only.

Rank: 3
Feedback: *****
Profile: Freelancer
Location: Palo Alto, CA, 94536
Hourly: $75.00

Take care to accept the right bid!

We strongly encourage you to contact the PenPal if you have any questions about the bid. Contacting is also a good idea so you can see if you and the PenPal can communicate well.

You have two means of contacting the PenPal
- Post a question to the project form. Your username and question will be visible to all PenPals.
   Add Question

- Ask the PenPal a private question. Your personal contact information will be provided so the PenPal can get in touch with you privately either by phone or email.
  [ Ask a Private Question ]

- ☑ I have carefully reviewed the bid including its project description and agree that this is what I want
- ☑ I have talked with this PenPal or have done other things that make me confident they are right for this job
- ☑ I agree with the HotDoodle Terms and Conditions regarding projects and bids. (See the Terms and Conditions)

[ Accept this bid ]  [ Cancel Accepting this bid ]

FIG. 20

| | Edit ✎ bid 🗑 Withdraw Bid |
|---|---|
|  Vivek Rau This bid has been accepted and is waiting for the PenPal to confirm ❓ Deadline: 08/28/08 11:27 PM | Membership Sites $75.00 Fixed Payment: Pay First, Bid Expires: 09/04/08   Rank: 3 Feedback: *  Profile: Freelancer Location: Palo Alto, CA, 94536 Hourly: $75.00  Website for patent discussions** Site will be limited to discussion boards only. [ Commit to doing this bid as described ] |

Welcome Vivek Walsh  My Info | Logout

HotDoodle®
PEN FOR THE WEB

| Homes | About | About 2 | Do It With Help | Do It Yourself | Support | My Stuff | PenPal Projects |

My Outstanding Bids

Project -- Committed -- You Won This Project!

Website for patent discussions
Based On: Basic New Site

[Bid on This Project]
[Ask a Private Question]

View Base Project

[I might bid, so Save in My Projects]

Contact Information

*Only the PenPal that wins the bid will see this*

Customer: Customer One

Contact: Joe User joeuser@hotdoodle.com
      Email Anytime
      Fremont, CA, 94536

PenPal: Vivek Walsh

Contact: 650 555-1313 test1xxxxx@hotdoodle.com
      Phone Morning
      Palo Alto, CA, 94536

Stats

Project Type: New Site
   Payment: Pay First
     Rate: $75.00 Fixed
   Timeline: 21 days
    Where: Work will be done remotely

FIG. 22

| | | |
|---|---|---|
| PAY THE PENPAL ? | | |

Pay the PenPal from the project's reserve.

You must read and agree with the Terms and Conditions

Warning: This transfer is irrevocable!

All payment transactions are considered final unless other arrangements are made directly between the customer and the PenPal. As a rule of thumb, a customer should not release funds from reserve unless they have all the facts needed to make a decision to pay the PenPal.

> Are you sure you want to irrevocably pay Vivek Rau $75.00?
>
> ☑ I have read and agree with the Terms and Conditions
>
> ☑ I acknowledge that I will not be able to get this money back through HotDoodle
>
> ☑ I commit that I will not dispute this payment through PayPal, and that should I make such dispute that HotDoodle may hold me responsible for any direct or indirect damages including those resulting from a change in the relationship between PayPal and HotDoodle and that I may be held responsible in the courts of California
>
> [ Click here to pay the amount to your PenPal ]    [ Cancel and do not pay ]

Warning: This is your last chance to change your mind. Clicking above executes the payment.

Note: This transfer is purely within HotDoodle and does not involve PayPal

FIG. 25

| | | |
|---|---|---|
| Website for patent discussions Completed and Paid  2 bids | Build me a website where I can have a private area with each patent team.  View Full Project | Due: 09/04/08 Rate: $75.00 Fixed Payment: Pay First In Reserve: $25.00 Paid: $75.00 |

FIG. 26

PenPals: Help Whenever It's Needed

We've created an industry first: a marketplace of web-savvy professionals called PenPals who can be engaged to work on HotDoodle sites. PenPals are HotDoodle design team members or independent freelancers who are experienced using HotDoodle's web-based building blocks to create or improve websites. Because HotDoodle is template and content-block driven, sites are built quickly and easily. Major site upgrades can be accomplished as easily as adding a calendarblock or bulletin board block.

Hiring a PenPal

Our PenPal marketplace offers whatever help is needed. You can engage a PenPal anytime, and because HotDoodle is completely online and template-driven, any PenPal can pick up where another left off. There are no proprietary software or source files to worry about. Best of all, you're always in control and don't have to worry about expensive fees for minor changes. You can edit your site anytime, anywhere, on your own.

Becoming a PenPal

[ Do It With Help ]

Are you web-savvy? Looking to make extra money? Join our marketplace and bid on projects! Anyone can be a PenPal, if they show they can successfully build websites using HotDoodle's simple template and block system. Not sure if you can? Try it now, free!

[ Be a PenPal ]

FIG. 28

You must register or log in to apply to become a PenPal.

Member Login

[username or email]

********

☐ Remember Me

Login

New Registration

Email : lslater2@hotdoodle.com

Password : *********

Confirm : *********

First Name : A pen

Last Name : Pal

Username : apenpal
eg. Bob123, is optional

Birth Year 1980
You must be 13
☐ Remember Me
☐ Receive usage tips and notices of new features?

Register Now

FIG. 29

HotDoodle® — PEN FOR THE WEB

Welcome A pen Pal   My Info | Logout

| Home | About | About 2 | Do It With Help | Do It Yourself | Support | My Stuff |

NEW PENPAL PROFILE

| Screen name | A pen Pal |
|---|---|
| Tag Line | Nice Guy |
| Real Name | A pen Pal |
| Portrait or Logo | [ Browse... ] |

| Phone numbers | 1-510-555-1212 |
|---|---|
| Email Address | abuse@spam.com |

Contact   Best Time: Anytime   Best Way: Email

Location   City: Fremont   State: CA   Zip: 94538

Country: US

Languages: English, Spanish

Hourly Rate: $75.00

Sell Yourself

| Which best describes you? | College Student |
|---|---|
| Highest Education Completed | High School Graduate |
| Other Education | High School Graduate |
| List of Special Skills | Well versed with HIPPA regulations |
| What motivates you? | Happy customers |
| Why do you like web projects? | Spreads my work |
| List two sites you like and why (Give examples) | lets-talk.com—easy and looks great |
| List two sites you dislike and why (Give examples) | Most myspace sites—ugly, jumbled, and dark |
| Your claim to fame | |
| Tell us About Yourself | |

[Arial] [2 (10 pt)]  B  I  U
Link  Pic  Edit Mode

Studying psychology and computer science. Math wizz.

[ Save ]   [ Cancel ]

FIG. 30

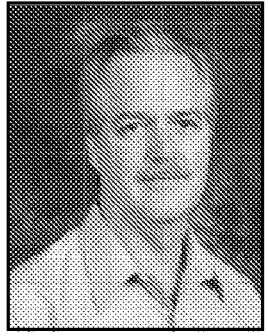

Profile: College Student
Location: Fremont, CA, 94538
Speaks: English, Spanish
Education: High School Graduate
Tank Commander
Hourly: $75.00
Skills: Well versed with HIPPA regulations Ask a Question Add to My Favorites

Contact Information 1-510-555-1212 abuse@spam.com
Email Anytime
Fremont, CA, 94536
English, Spanish

Self Description

Studying psychology and computer science. Math wizz.

Background

| | |
|---|---|
| Motivation | Happy customers |
| Why like web projects | Spreads my work |
| Sites liked and why | lets-talk.com—easy and looks great |
| Sites disliked and why | Most myspace sites—ugly, jumbled, and dark |

Portfolio

 Add Portfolio 

FIG. 32

Portfolio

Law Library

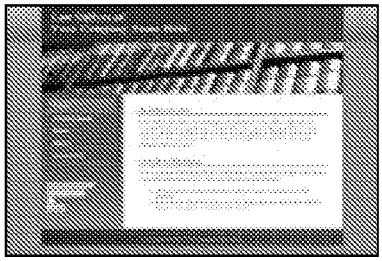

I designed the look (stock photo choice, graphics, layout, colors, and fonts) for this template, gearing it towards a legal office website.

Court Date

I designed this one as an alternate version of the above Law Library template.

Cobalt Glass

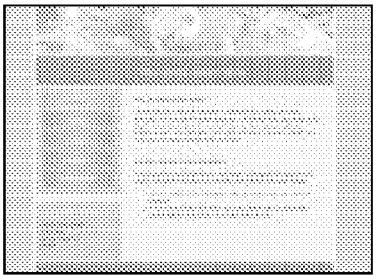

I designed the look (stock photo choice, graphics, layout, colors, and fonts) for this template, gearing it towards a glass art website.

Art Appreciation

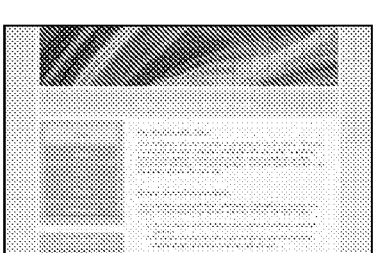

I designed this one as an alternate version of the above Cobalt Glass template.

FIG. 35

PenPal Approval ?

O Interested  O Pending  ⦿Approved  O Denied  O Rejected  O Withdrawn

*Rank             [ 3 ]         Admins only
*Feedback        [ 0 ]         Admins only
Approval Comments   [You should flush out your description]
*Renege          [ 0 ]         Admins only

[Advanced Fields]

[Save]   [Cancel]

Nice Guy

Rank: 3
Profile: College Student
Location: Fremont, CA, 94538
Speaks: English, Spanish
Education: High School Graduate
               Tank Commander
Hourly: $75.00
Skills: Well versed with HIPPA regulations

[ Invite a Bid ]
[ Ask a Question ]
[ Add to My Favorites ]

Contact Information 1-510-555-1212 abuse@spam.com
Email Anytime
Fremont, CA, 94536
English, Spanish

Self Description

Studying psychology and computer science. Math wizz. Winner of ACM programming contest. Have quotes and letter of recommendation from customers. Very reliable.

Background

| | |
|---|---|
| Motivation | Happy customers |
| Why like web projects | Spreads my work |
| Sites liked and why | lets-talk.com—easy and looks great |
| Sites disliked and why | Most myspace sites—ugly, jumbled, and dark |

Pre-Defined Projects I Have Authored

[ Create a New Pre-Defined Project from Scratch ]

FIG. 40

NEW PRE-DEFINED PROJECT

| Your Offering Name | Create custom logos and gifs to jazz up your site |
|---|---|
| Project Type: | Enhancements to a working HotDoodle site |

Site Features
- ☑ List of services
- ☐ Organization history
- ☐ Contact information
- ☐ Contact form
- ☐ List of relevant articles
- ☐ Testimonials
- ☑ Photo gallery
- ☐ Photo or work sample slideshow
- ☐ Newsletter
- ☐ Discussion boards
- ☐ Automated email response upon registration
- ☐ Time based content (example: ads that come and go by date)
- ☐ Rotating content (example: text that changes upon refresh
- ☐ Calendar
- ☐ Pay to register
- ☐ Paid or private areas (example: customer only pages)
- ☐ Visitors can edit
- ☐ Visitors can post
- ☐ Visitors or customers get editable customized profile page
- ☐ Simple selling
- ☐ Customers get customized emails upon purchase
- ☐ Customers get special site access upon purchase
- ☐ Product catalog Customer Supplied Elements
- ☑ Business descriptions
- ☐ Business specific pictures
- ☐ Other related pictures to add interest
- ☐ Product catalog
- ☐ Logo

FIG. 41

Information About my Offering

| Verdana | 2(10 pt) | B *I* U |

Will make up to 10 gifs and logos specific to your site and descriptions.

Operational Preferences

Lock these Options ☐ [?]

Work Location    ⦿ Work will be done remotely
                     ○ Must come onsite now and then (may cost more)

Timeline      [ 21 ] Days from project start

Rates

Fixed ⦿    Rate: [$300.00]
       Hourly ○    Per Hour: [$0]

Payment Schedule

⦿ Payment in Full after project is completed [?]

○ Payment in Full before project starts [?]

○ Progress Payments [?]

Progressive Payment Schedule [?]

No matter when payments are to be transferred to the PenPal, some projects might require that some or all of the payment be placed in reserve before the project starts. This is a sign of good faith from the customer to the PenPal. [?]

[$150.00] Amount Customer *must* place in reserve before accepting your bid

Active Offering ☑ [?]

Notify Me      ☑ Send emails when new projects use this pre-defined project [?]

FIG. 42

Stats

Project Type: Enhancement
  Payment: Work First
    Rate: $300.00 Fixed with $150.00 of it to be placed in reserve
Client Speaks: English, Spanish
Timeline: 21 days
  Where: Work will be done remotely

Description

Will make up to 10 gifs and logos specific to your site and descriptions.

Background

Site features required:
- List of services
- Photo gallery

Customer will supply:
- Business descriptions

The following PenPals Support this Pre-Defined Project:

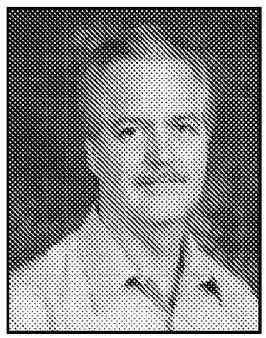

A Pen Pal

Nice Guy

$300.00 Fixed
Original author of the pre-defined project

Edit  Delete

Rank: 3
Feedback: *****
Profile: College Student
Hourly: $75.00

FIG. 43

Interested in being a PenPal?

List Of PenPals

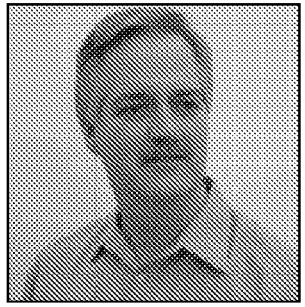

Lynn Slater

Custom Features

Creator of HotDoodle and most of its example sites

View Full Profile

Rank: 5
Feedback: \*\*\*\*\*
Profile: College Student
Hourly: $175.00

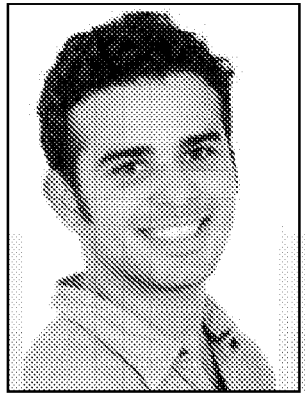

Tom Simons

I'm here to help you with all your website needs!

I enjoy helping others promote their business online! I have a lot of experience creating all kinds of websites.

View Full Profile

Rank: 4
Feedback: \*\*\*\*\*
Profile: Freelancer
Hourly: $15.00

I'm your #1 resource for all your web-creation needs!

View Full Profile

Rank: 3
Feedback: \*\*\*\*\*\*
Profile: College Student
Hourly: $10.00

FIG. 44

| Background | |
|---|---|
| Motivation | Happy customers |
| Why like web projects | Spreads my work |
| Sites liked and why | lets-talk.com—easy and looks great |
| Sites disliked and why | Most myspace sites—ugly, jumbled, and dark |

Pre-Defined Projects I Have Authored ?

Create custom logos and gifs to jazz up your site [View or Use This Project]

Other Pre-Defined Projects I Support ?

| Basic New Site | $99.00 Fixed<br>Basic New Site | [View or Use This Project] |
| Internal Corporate Site | $5000.00 Fixed<br>Internal Corporate Site | [View or Use This Project] |

Sharing and Advertising
Customers can always find your predefined project under your PenPal profile, if they think to read it. Your project can get extra attention if you let other PenPals offer it and if you let HotDoodle advertise it.

Hot Tip: Why Share? ?
    Hot Tip: What is with HotDoodle Advertising? ?

Is Sharable ☑ ?

Can be Advertised ☑ ?

[Submit and Review] [Cancel]

FIG. 46

| Pre-Defined Projects for Existing Sites ❓ | | |
|---|---|---|
| Search Engine Optimization | Offered At:<br>Fixed: $450.00 | View or Use This Project |
| Add a Newsletter<br>Start supporting this pre-defined project | Offered At:<br>Fixed: $50.00 to $125.00 | View or Use This Project |

FIG. 47

Description

Add a newsletter into an existing site. Package includes configuration of web based signup, creation of customized "Thank you for joining" emails, creation of a past issue archive, and creation of a newsletter wrapping format.

The following PenPals Support this Pre-Defined Project:

Lynn Slater

Custom Features $75.00 Fixed

Original Author of the Pre-Defined Project

Rank: 5
Feedback: ✶✶✶✶✶✶
Profile: College Student
Hourly: $175.00

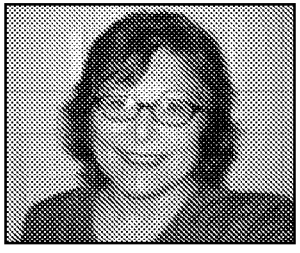

Anna Slater

Nice Lady $50.00 Fixed
Anna News

Rank: 1
Feedback: ✶✶✶✶✶✶ Read
Profile: High School Student
Hourly: $50.00

FIG. 48

PenPal Profile

Tom Simons

I'm here to help you with all your website needs!

Rank: 4

Feedback: *****

Profile: Freelancer

Location: Mountain View, CA, 94041

Speaks: English, Spanish

Hourly: $15.00

Skills: Create brand new websites, Copywriting services, Add Newsletters, blogs, discussion forums, email, and much more!

Self Description

I enjoy helping others promote their business online! I have a lot of experience creating all kinds of websites.

Looks Specialist

I create custom looks for your site. I also resell from my own set of custom looks.

View Full Profile

Rank: 2
Feedback: ***** 1 review
Profile: Freelancer
Hourly: $90.00

Sara Lookgood

Membership Sites

I love group sites where visitors register and then gain access, editing privileges, or their own sub-pages.

View Full Profile

Rank: 3
Feedback: ***** 2 reviews
Profile: Freelancer
Hourly: $75.00

Vivek Rau

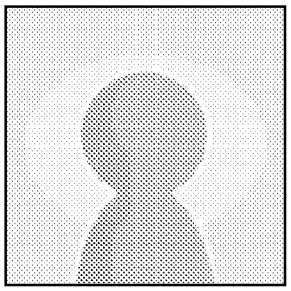

The best ever

This paper suggests what IT organizations should consider when creating a short list for ITIL and CMDB products, the Opsware ITIL and CMDB solution, and implementing change, compliance or configuration management processes.

View Full Profile

Rank: 3
Feedback: ***** 1 review
Hourly: $90.00

Best PenPal 11

FIG. 54

Feedback on Vivek Rau
Combined Score *****

Technical Skill: *****
Creativity: *****
Timeliness: *****
Communications: *****
Overall: *****

Website for patent discussions

Vivek delivered as promised. He tended to favor dark backgrounds with light text but he changed when I expressed my preferences.

Technical Skill: *****
Creativity: *****
Timeliness: *****
Communications: *****
Overall: *****

Anna's Basic Site

Vivek delivered as promised. He tended to favor dark backgrounds with light text but he changed when I expressed my preferences.

FIG. 55

PROMOTING A WEB TECHNOLOGY THROUGH A VIRTUAL SERVICE MARKETPLACE

CROSS REFERENCE TO RELATED APPLICATIONS

This application claims the benefit of provisional patent application No. 60/967,636 titled "Promoting A Web Technology Through A Virtual Service Marketplace", filed on Sep. 6, 2007 in the United States Patent and Trademark Office.

BACKGROUND

This invention, in general, relates to electronic commerce applications. More particularly, this invention relates to promotion of a web technology through a virtual service marketplace on a host website.

A web creation service is a type of internet hosting service that allows users and organizations to provide a website accessible via the World Wide Web. The web creation service includes tools and techniques for web site creation and also provides computing devices and internet facilities on which these web sites execute. Web creation is required for personal usage, small business, group sites etc. There is a need for a web creation service that offers a secure, reliable, and affordable way to get a website up and running in minimal time. While the service may include all of the tools required to create a website, some users may prefer to not fully learn the tools and to have others do the work. Other tasks involved in creating an effective website may have only the end product entered through online tools. For example, a marketing pitch may be developed mostly outside of the website and then transferred into the website via the online tools provided by the web creation service. Some tasks may require expertise in particular industries. Most web creation services either require that a user provide for their own needs and find their own consultants, or require only consultants that work for the company which offers the web creation service at a price established by the company. There is a need for a web creation service that provides a presence in one location of technology, a virtual service marketplace, and ability for a user to become an independent consultant.

Many web site creation technologies often do not integrate well with each other. There are many general marketplaces and job posting services where the user may seek help with any particular project. Despite efforts at categorizing and filtering jobs and responses, it is common for users to receive many responses that are unsuitable for work or compatible with the website of the user. Hence, there is a need for a virtual service marketplace where the responses are from consultants who provide services that may run and interoperate on a common web technology.

The differences in web technologies may cause a user to become dependent upon a particular consultant or consulting firm familiar with building the user's website. This dependency may cause problems if the consultant becomes unavailable or unaffordable. Hence, there is a need for a source of flexible consultants who may perform the work of other consultants.

Hence, there is a need for promoting a web technology through a virtual service marketplace on a host website. There is also a need for selecting cost effective and expert services of consultants from multiple consultants in the virtual service marketplace.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated needs for promoting a web technology through a virtual service marketplace on a host website. The computer implemented method disclosed herein further enables selection of cost effective and expert services of consultants from multiple consultants in the virtual service marketplace.

The computer implemented method and system provides online tools on the host website. The host website comprises a virtual service marketplace of users and multiple consultants. The online tools are used for creating a project website. The online tools may also be used for modifying or enhancing a pre-existing project website available on the host website. A user and the consultants register on the host website to create the virtual service marketplace, and gain access to the online tools. The user may start with a blank project, or start a project based on a selected package. The user defines a project by providing a description of the project, a due date and due time of bids for the project, and core controlling factors associated with the project. The user proposes the project to multiple consultants in the virtual service marketplace to create the project website. The project website may be, for example, one of an interactive website, a business website, a gaming website, a news website, a shopping website, a social networking website, etc.

The consultants bid for the proposed project in the virtual service marketplace. The bids created by the consultants may either be identical to the terms of the project and differentiated only by the quality of the consultants, or the bids may differ in the project description and the core controlling factors. The core controlling factors may comprise, for example, a pricing model for the project, turnaround time of the project, a payment plan, payment details, and initiation amount placed in a project fund of the user. The core controlling factors set by the user for the defined project are synchronized with the core controlling factors set by the consultants. The user then selects a project consultant from the consultants based on the synchronization. The selected project consultant creates the project website using the online tools on the host website. The user may also create the project website using the online tools provided on the host website. The user and the consultants may use the online tools to modify and enhance the created project website or a pre-existing project website.

The user pays the selected project consultant for creating the project website using an electronic transfer of funds. The payment made to the project consultant also generates commissions for the host website. The host website may also list the status of the consultants and consultant applications. The user and the consultants may also be notified of bids, changes in the core controlling factors, and status of the creation of the project website.

The consultants may also create packages comprising descriptions of example projects and the core controlling factors associated with the project. The packages may be shared between the consultants to establish the virtual service marketplace of variants of particular packages and to increase visibility of the packages on the host website. The packages may be displayed on the profile of the consultants. The user may select these packages to create a project based on the characteristics of these packages.

The computer implemented method and system disclosed herein establishes the virtual service marketplace on the host website. The virtual service marketplace is established by the interactions between the user and the consultants during the creation of the project website. The virtual service marketplace comprises the users and the consultants with profiles, portfolios, feedback, and ranking. The computer implemented method and system disclosed herein enables the user to search for consultants by bidding out the project. The user may also search for consultants from the list of consultants and invite one or more of the consultants to submit a bid. The user may select any one of different consultants who bid competitively on the host website. The user is therefore assured of achieving the project website by the desired consultant by using the web technology. The computer implemented method and system disclosed herein also enables the user to become an independent project consultant and seek businesses to draw more users to the host website, thereby promoting the host website through the virtual service marketplace. The virtual service marketplace also promotes the web technology by enabling the user to find project related assistance on the host website. The availability of different consultants working with the same web technology makes the user independent of any particular consultant. The users and consultants may further promote the web technology by encouraging other users to make use of the web technology. The presence of the virtual service marketplace promotes the web technology and the growth in numbers of users and consultants familiar with the web technology.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIGS. 5-6 exemplarily illustrate registration of the user for a project website.

FIG. 7 exemplarily illustrates a webpage providing information about the consultants.

FIGS. 8-9 exemplarily illustrate definition of a project by the user.

FIGS. 10-11 exemplarily illustrate the user defining a basic project website.

FIGS. 15-22 exemplarily illustrate processes involved in bidding for a project.

FIGS. 24-27 exemplarily illustrate a payment process.

FIGS. 28-29 exemplarily illustrate registration of a consultant on the host website.

FIGS. 30-39 exemplarily illustrate creation and approval of a profile of the consultant.

FIG. 40 exemplarily illustrates creation of a new project by the consultant.

FIGS. 41-43 exemplarily illustrate the definition of the project by the consultant.

FIGS. 44-45 exemplarily illustrate a list of profiles of the consultants as viewed by the users and other consultants.

FIGS. 46-49 exemplarily illustrate sharing of packages of the consultant.

FIG. 50 exemplarily illustrates the user as an independent consultant.

Figure 51:
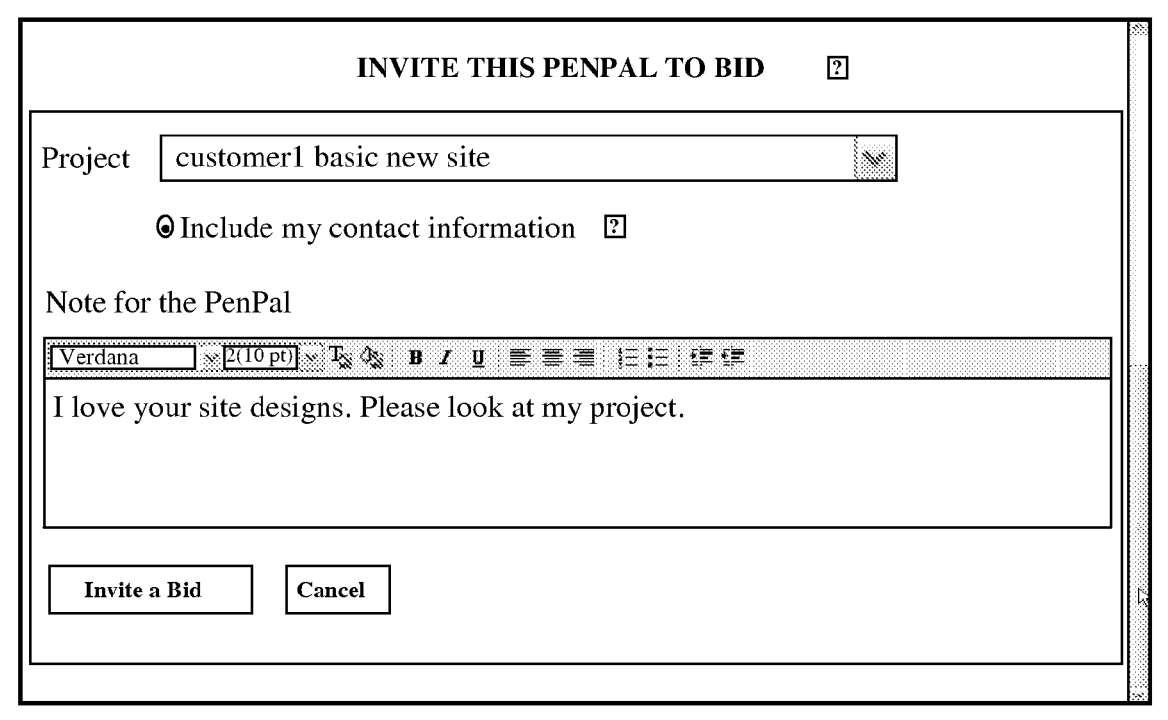

FIG. 51 exemplarily illustrates an invitation for bidding sent to the project consultant by the user.

FIG. 54 exemplarily illustrates a list of consultants with feedback, ranking, and reviews.

FIG. 55 exemplarily illustrates reviews provided to the consultant by users.

DETAILED DESCRIPTION OF THE INVENTION

Figure 1:
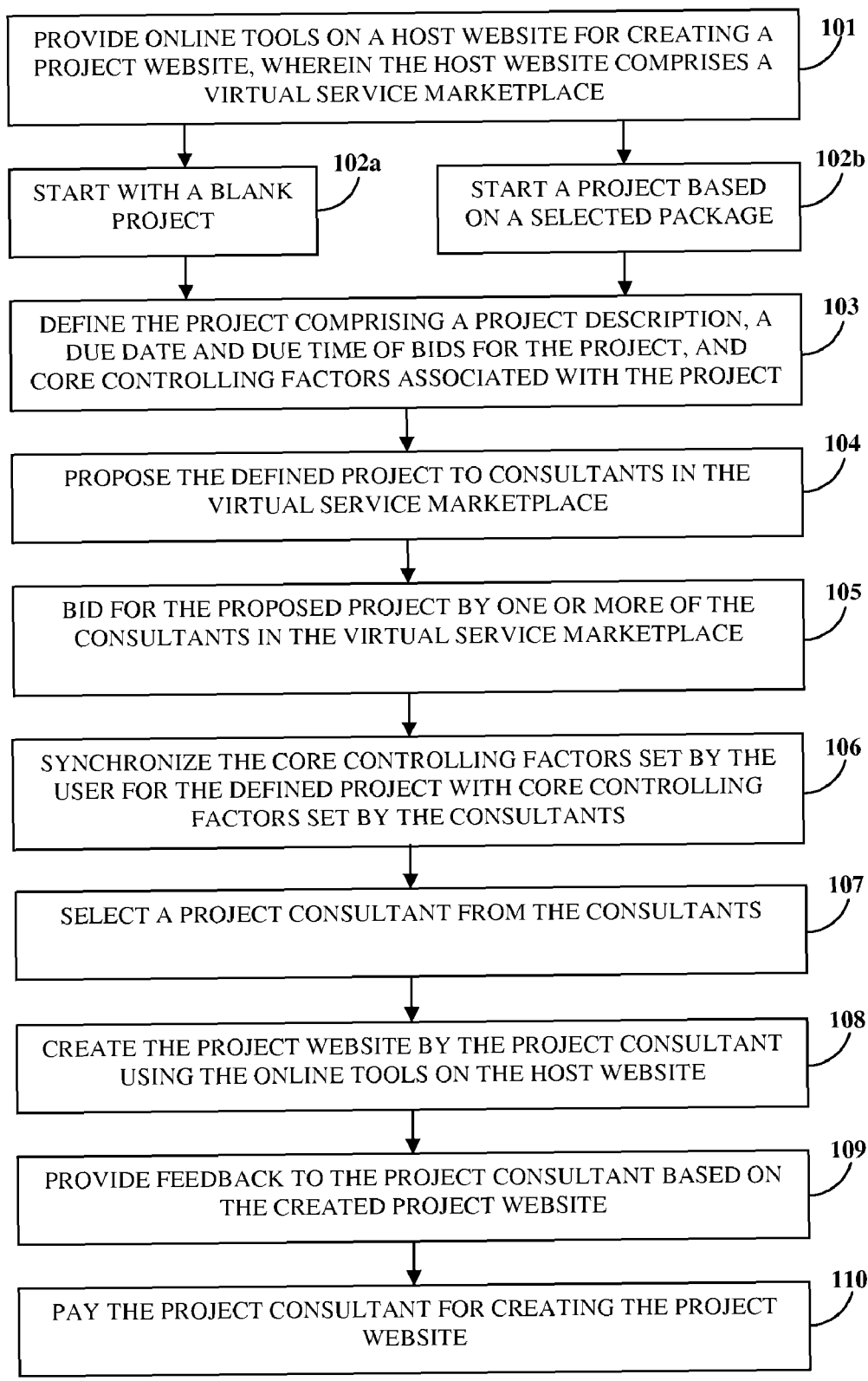
FIG. 1 illustrates a computer implemented method of promoting a web technology through a virtual service marketplace on a host website.

FIG. 1 illustrates a computer implemented method of promoting a web technology through a virtual service marketplace on a host website. The web technology may be, for example, a website technology or a website building and presentation technology. The computer implemented method disclosed herein provides 101 online tools on the host website for creating a project website. The host website comprises the virtual service marketplace of users and multiple consultants. A user and the consultants register with the host website to create the virtual service marketplace. Consultants of different expertise may register on the host website. For example, some consultants may have knowledge of the best practices for chamber of commerce sites. The registration enables the user and the consultants to access the online tools on the host website. The online tools comprise software tools for building the project website and structuring of the layout, content, and the aesthetics of the project website. The user and the consultants may use the online tools to create, edit, and manage the project website. The online tools may also be used for enhancing a pre-existing project website available on the host website. The project website may be one of an interactive website, a business website, a gaming website, a news website, a shopping website, a social networking website, etc. The project websites mentioned above are provided only by way of example.

The user may start with a blank project 102*a*, or start a project based on the characteristics of a selected package 102*b*. The user defines 103 a project by providing or altering the description of the project, a due date and due time of bids for the project, and core controlling factors associated with the project. The core controlling factors may comprise, for example, a pricing model for the project, turnaround time of the project, a payment plan, payment details, initiation amount placed in a project fund of the user, etc. The core controlling factors mentioned above are provided only by way of example. The user proposes 104 the defined project to the consultants in the virtual service marketplace to create the project website. The user may also browse lists of consultants on the host website and invite particular consultants to bid. The host website lists status of the consultants and consultant applications. For example, the host website may list the pending consultant applications, the approved consultants, the denied consultants, etc.

One or more of the consultants bid 105 for the proposed project in the virtual service marketplace. The consultants may browse lists of projects and choose to bid for a particular project. The consultants may also bid on receiving an invitation from the user to bid for a particular project. The consultants may change the core controlling factors of the proposed project. The consultants differ in quality and their bids differ in price, timeline, and scope of work. The changes made by the consultants to the core controlling factors of the proposed project are displayed along with the bids made by the consultants. The changes in the core controlling factors of the proposed project and other information may be notified to the user and the consultants via electronic mail (email), short message service (SMS) messages, etc. The definition of a project comprises a due date and due time for the bids. The consultants cannot create bids for the project, if the current time is past the due date and due time of the bids. The user may change the due date and due time of the bids for the project. The changes in the due date and due time of the bids is applicable to future bids made for the project. The competitive bidding by the consultants ensures a fair price to the user for creation or enhancement of the project website.

During bidding, the core controlling factors set by the user for the defined project are synchronized 106 with the core controlling factors set by the consultants. Mismatches between the core controlling factors set by the consultants and the core controlling factors set by the user for the proposed project are displayed on the host website. The user may accept the core controlling factors set by one of the consultants, and then change the corresponding core controlling factors of the project. The bids of the consultants may be accepted only when the core controlling factors of the project and the bids are identical. Check boxes are provided on a graphical user interface (GUI) for each of the non-identical core controlling factors set by the consultants, and displayed on the host website. On selecting the checkboxes for the non-identical core controlling factors set by the consultants, the corresponding core controlling factors in the project will take the values of the core controlling factors set by the consultants. After a match is found between the two sets of core controlling factors, a project consultant of the accepted bid will be selected. The user selects 107 the project consultant from the consultants based on the synchronization. After the user selects the project consultant, the project consultant commits to completing the project according to the core controlling factors. If the project consultant has not committed to completing the project, the user may retract the selection and select another project consultant from the multiple consultants.

The selected project consultant then creates 108 the project website using the online tools on the host website. The project consultant may create one of an interactive website, a business website, a gaming website, a news website, a shopping website, a social networking website, etc. according to the definition of the project provided by the user. The user may also use the online tools to create the project website. The user and the consultants may also use the online tools to modify and enhance the created project website. The user may also provide 109 feedback to the project consultant based on the quality of work done on the created project website.

The user pays 110 the selected project consultant for creating the project website. The payment may be made at different intervals of time as defined in the project. For example, the payment may be made in full after the project is completed, in full before the project starts, or in progressive intervals of time. The user maintains a user general fund and a user project fund. The user general fund and the user project fund are displayed on a project definition webpage supported by a project definition module. The user general fund is created when the user first attempts to transfer funds from banks, credit card companies, third party fund sources, and a combination thereof. The user project fund is created when the project has been defined and the user decides to transfer funds from the user general fund to the user project fund. Transfers from the user general fund to the user project fund establish balances in the user project fund. The user general fund may also be used for payments for system services such as web hosting.

The user transfers funds from the user general fund to the user project fund for the proposed project. The user project fund contains the initiation amount for the project before the bidding begins. The initiation amount may be zero, the initial price quoted by the user for the project before the bidding begins, or may be any value set by the core controlling factors of the project. The consultants may view the balance in the user project fund and are informed of any changes in the user project fund. The project consultant maintains a consultant general fund. The user pays the project consultant by transferring a payment from the user project fund to the consultant general fund. When the project consultant has been selected, the project consultant may view the transactions in the user project fund and is informed of any changes in the balance available in the user project fund.

Paying the project consultant for creating the project website comprises generating a commission for the host website. For example, if the user pays the project consultant $10.00 for the project, the user project fund for the project will be decreased by $10.00 and the consultant general fund will be increased by $8.00. The difference of $2.00 will be the commission generated for the host website. The project consultant may choose to refund the payment or part of the payment for the project. The project consultant refunds the payment by transferring the payment from the consultant general fund to the user project fund. In this case, the commission retained by the host website will be proportionately restored. For example, if the consultant refunds $4.00 to the user, the user project fund may receive $5.00 with the additional $1.00 provided by the host website.

The user may submit feedback on the project consultant after accepting a bid from the project consultant even if the project consultant never completes the project. The feedback submitted by the user may be stored in the profile of the project consultant along with ratings of the project. The user may provide feedback only for the project consultant selected from the multiple consultants. The user may also enter feedback on the consultants who reneged on their bids. The profiles of the consultants contain an indicator of the frequency of reneging. The consultants may have a tougher time being selected, if their profiles contain an indication of reneging. The host website may notify the user and the consultants of bids, changes in the core controlling factors, and status of the creation of the project website. The host website may send notifications to the user and the consultants via email, SMS messages, etc.

The project consultant may also define and create packages comprising descriptions of example projects and the core controlling factors associated with the projects. The packages are shared between the consultants to establish the virtual service marketplace of variants of particular packages and to increase the visibility of the packages on the host website. The packages may be defined such that other consultants may also share the same packages. The user may define the project based on one of the packages defined by the project consultant. The declarations associated with the packages are applicable to the project unless the project comprises a contrary statement.

The packages defined by the project consultant may be exclusive or shared with other consultants. If a package is exclusive, the consultants cannot offer that exclusive package to other consultants but may offer packages with contents and controlling factors identical to the contents and the controlling factors in the exclusive package. If a package is shared by the consultants, the package will be listed in the profile of each of the consultants sharing the package. The descriptions and the core controlling factors in a shared package may be changed only by the consultants who originally defined the shared package. When a particular shared package is displayed on the host website, the offerings of the consultants for that particular package are also displayed. Package sharing establishes an immediate virtual service marketplace of variants for particular packages. Package sharing also establishes an immediate virtual service marketplace of the consultants ready to create or enhance the project websites based on particular packages.

The project consultant may share their packages in order to increase the visibility of the shared packages. The packages may be displayed on the profile of the project consultant. The packages may also be displayed on the project definition start page of the host website. The project consultant may also offer a shared package of another project consultant to increase visibility of the shared package. For example, a project consultant may offer a very popular package shown on the project definition start page of the host website, or they may decide to create a nearly identical package visible only to those visiting the profile of that project consultant. The host website may make some packages more visible than other packages in order to enable the creation of attractive packages. The host website may reward the attractive packages with better placement on the host website. The desire for preferred placement and increased visibility may motivate the project consultants to share their packages or to offer packages shared by other project consultants.

The computer implemented method disclosed herein also enables the user to become an independent project consultant and seek businesses to draw more users to the host website. Advertising of the web technology draws users to the host website. The host website establishes the virtual service marketplace where consultants have profiles, portfolios, feedback and ranking, and where the users may search for a project consultant or bid out their projects. The host website provides the web technology to create a project website, edit the project website, and bid out projects to the virtual service marketplace. The user may select a project consultant from this virtual service marketplace. The availability of different consultants working with the same technology makes the user less dependent on a particular consultant.

The virtual service marketplace is established by the interactions between the user and the consultants during the creation of the project website. The presence of the virtual service marketplace, therefore, encourages the use of the web technology and the growth in numbers of users and consultants familiar with the web technology at a fair price compared to other consultants. The user may further use the virtual service marketplace to bring in technical writers, marketing consultants, graphic artists, search engine optimization specialists, etc. to get a web presence. Further, users competent in the web technology may offer services as independent project consultants, thereby promoting the web technology through the virtual service marketplace.

The virtual service marketplace also promotes the web technology by enabling the user to find project related assistance on the host website. The web technology may be promoted by allowing enhancements of projects outside of the technical challenges of using the web technology to create a web site. The availability of different consultants working with the same technology makes the user less dependent on any particular consultant. For example, the user may utilize the services of a technical writer applying the web technology in certain aspects of technical writing. Access to a technical writer who will work with the web technology may make the web technology more appealing to a user even if most of the technical writing effort does not depend on the web technology. The users and consultants may further promote the web technology by encouraging other users to make use of the web technology.

Figure 2:
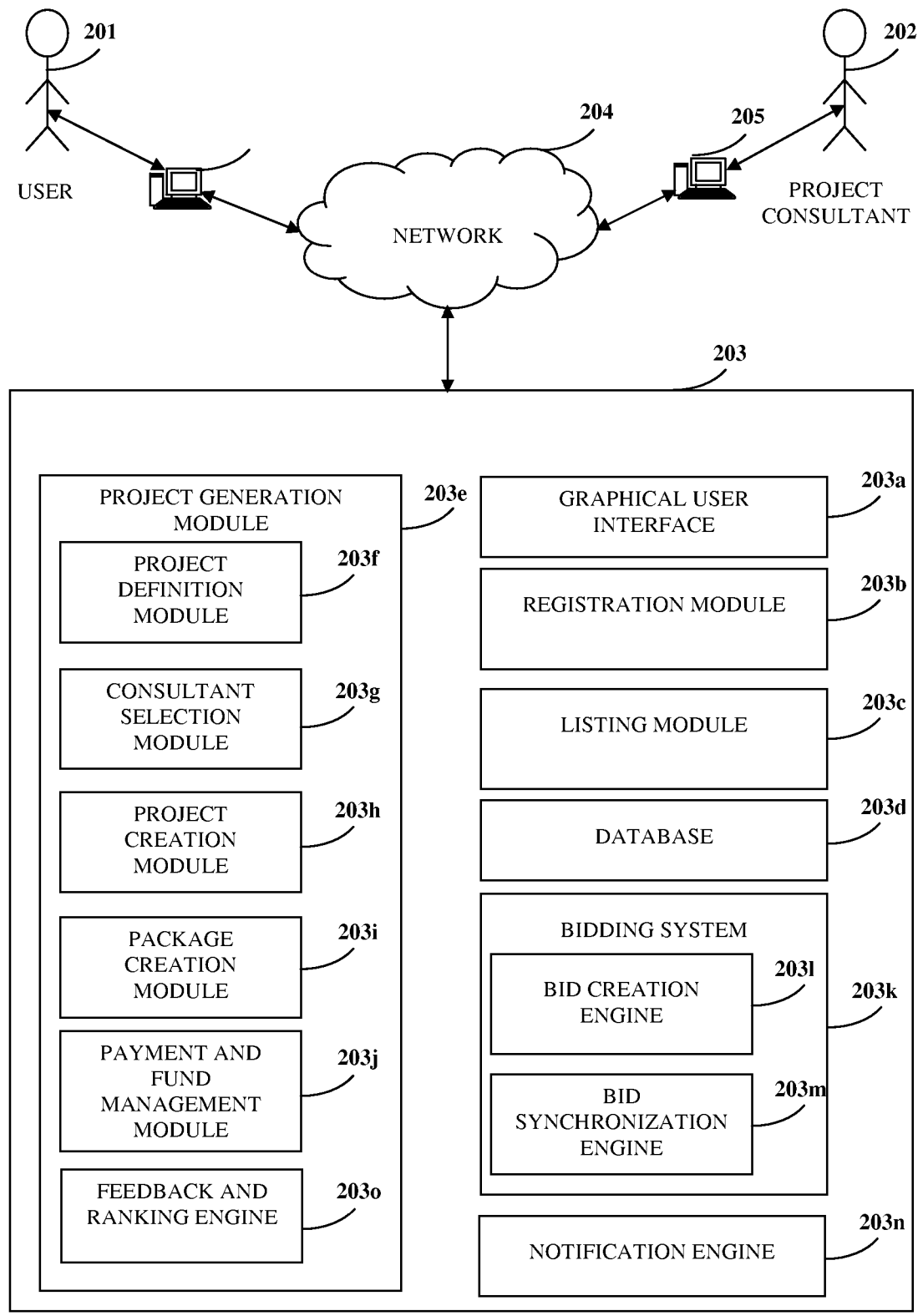
FIG. 2 illustrates a computer implemented system for promoting a web technology through a virtual service marketplace on a host website.

FIG. 2 illustrates a computer implemented system 203 for promoting a web technology through a virtual service marketplace on a host website. The computer implemented system 203 disclosed herein comprises a graphical user interface (GUI) 203a, a registration module 203b, a listing module 203c, a project generation module 203e, a bidding system 203k, a notification engine 203n, and a database 203d. The users and the consultants access the system 203 via a computing device 205. The computing device 205 may be, for example, a personal computer, a laptop, a mobile phone, a personal digital assistant, etc. The GUI 203a provided on the host website comprises online tools for creating a project website. The online tools comprise software tools for building the project website including the structuring of the layout and the aesthetics of the website. A user 201 and multiple consultants may use the online tools to create, edit, and manage the project website. The GUI 203a on the host website links the user 201 and the consultants with the registration module 203b, the listing module 203c, the project generation module 203e, the bidding system 203k, the notification engine 203n, the feedback and ranking engine 203o, and the database 203d via a network 204.

The user 201 and the consultants register with the host website to create the virtual service marketplace. The registration module 203b registers the user 201 and the consultants with the host website. The user 201 and the consultants register with the host website using the registration module 203b via the GUI 203a. The registration module 203b provides the user 201 and the consultants with access to the online tools on the host website to create a project website. The listing module 203c lists the consultants in the virtual service marketplace along with the expertise and qualifications of the consultants. The listing module 203c further lists the status of the consultants and consultant applications on the host website.

The project generation module 203e comprises a project definition module 203f, a consultant selection module 203g, a project creation module 203h, a package creation module 203i, a payment and fund management module 203j, and a feedback and ranking engine 203o. The project definition module 203f enables the user 201 to define a project and propose the defined project to the consultants in the virtual service marketplace to create the project website. The user 201 defines the project by entering a description of the project, a due date and due time of bids for the project, and core controlling factors associated with the project using the GUI 203a. The core controlling factors comprise a pricing model for the project, turnaround time, a payment plan, payment details, and initiation amount placed in a project fund of the user 201. The project definition module 203f enables the user 201 to change the due date and due time of the bids for the project. The changes in due date and due time of the bids are applicable to the future bids made for the project.

After the definition of the project by the user 201, the consultants bid for the proposed project using the bidding system 203k. The user 201 may search for consultants by browsing the list of consultants defined by the listing module 203c, and invite one or more of the consultants to submit a bid for the proposed project. The consultants may browse lists of projects and choose to bid for a particular project. The bidding system 203k communicates with the project generation module 203e. The bidding system 203k comprises a bid creation engine 203l and a bid synchronization engine 203m. The consultants create bids for the proposed project using the bid creation engine 203l. The consultants may change the core controlling factors of the proposed project using the bid creation engine 203l. The bid creation engine 203l verifies the due date and due time of the bids for the project. The bid creation engine 203l allows the creation of bids for the proposed project only if the current time is not past the due date and due time of the bids as defined by the user 201 for the project.

The bid synchronization engine 203m synchronizes the core controlling factors set by the user 201 and the core controlling factors set by the consultants for the proposed project. The bid synchronization engine 203m detects the mismatches between these two sets of core controlling factors of the bids and displays the mismatches on the GUI 203a. The consultant selection module 203g enables the user 201 to select a project consultant 202 from the consultants. The consultant selection module 203g communicates with the bid synchronization engine 203m of the bidding system 203k via the network 204. If any of the core controlling factors differs between the project and the bid, the user 201 may change the corresponding core controlling factors in the project. When no differences remain between the two sets of the core controlling factors, the project consultant 202 is selected for the proposed project using the consultant selection module 203g.

The selected project consultant 202 then creates the project website using the project creation module 203h. The project creation module 203h enables the creation of one of an interactive website, a business website, a gaming website, a news website, a shopping website, a social networking website, etc. The project creation module 203h also enables the user 201 to create the project website using the online tools of the host website. The project creation module 203h also enables the user 201 or the consultants to modify and enhance the project website using the online tools on the host website.

The package creation module 203i enables the project consultant 202 to create packages comprising descriptions of example projects and core controlling factors associated with the example projects. The packages created by the package creation module 203i may be used by the project creation module 203h when the user 201 chooses to start a project based on the characteristics of a selected package. The package creation module 203i shares the packages created by the package creation module 203i with other consultants.

At different intervals as defined in the project, the user 201 pays the project consultant 202 using the payment and fund management module 203j of the project generation module 203e. The payment and fund management module 203j allows the creation of a user general fund and a user project fund. The user general fund and the user project fund are displayed on a project definition website supported by the project definition module 203f. Funds may be transferred from banks, credit cared companies, third party fund sources, and a combination thereof, to the user general fund using the payment and fund management module 203j. The user project fund is created when the project has been defined and the user 201 decides to transfer funds from the user general fund to the user project fund.

Further, the user 201 uses the payment and fund management module 203j to transfer funds from the user general fund to the user project fund for the proposed project. The payment and fund management module 203j is used for the creation of a consultant general fund for the project consultant 202. The user 201 pays the project consultant 202 by transferring a payment from the user project fund to the consultant general fund using the payment and fund management module 203j. The payment and fund management module 203j also generates a commission for the host website. For example, if the user 201 pays the project consultant 202 $10.00 for the project, the payment and fund management module 203j decreases the user project fund by $10.00, and increases the consultant general fund by $8.00. The payment and fund management module 203j extracts the difference of $2.00 as the commission for the host website. The project consultant 202 may refund the payment by using the payment and fund management module 203j to transfer the payment from the consultant general fund to the user project fund.

The feedback and ranking engine 203o enables the user 201 to submit feedback on the project consultant 202 after accepting the bid of the project consultant 202. The feedback submitted by the user 201 may be stored in the profile of the project consultant 202 along with ratings of the project. The feedback and ranking engine 203o also ranks the consultants based on the created project websites. The profile of the project consultant 202 may comprise portfolios, feedback from users, and ranking of the project consultant 202 based on the created project websites. Portfolios comprise screenshots and descriptions of the project websites previously created by the project consultant 202. The database 203d stores a list of users, a list of the consultants, profiles of the users, profiles of the consultants, a list of projects defined by the users, bid expiration dates of the projects, core controlling factors of the projects, and a list of packages defined by the consultants. The notification engine 203n notifies the user 201 and the consultants of bids, changes in the core controlling factors, and status of the creation of the project website.

Figure 3:
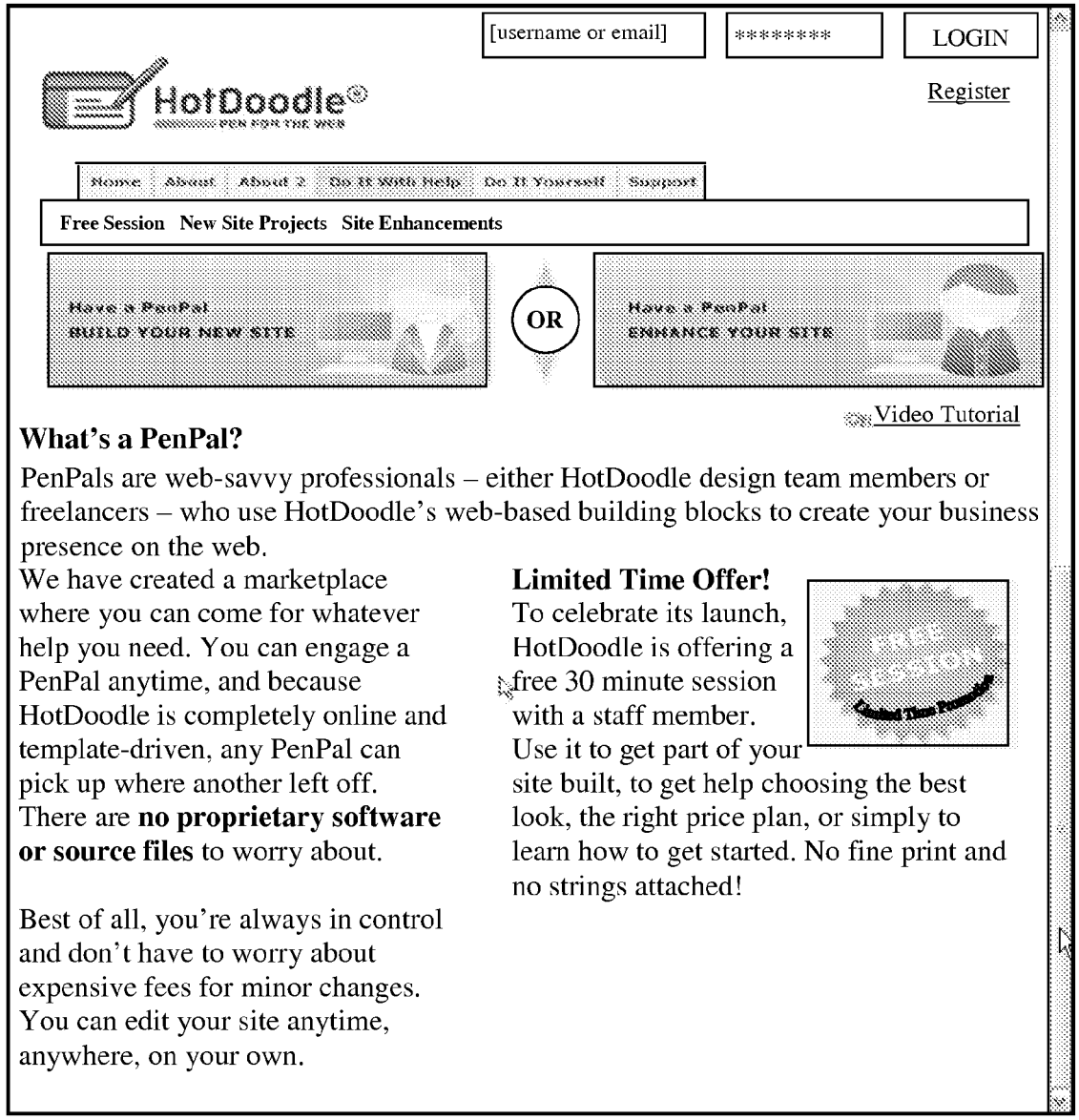
FIGS. 3-4 exemplarily illustrate an entry page of the host website that greets the user and the consultants.
Figure 4:
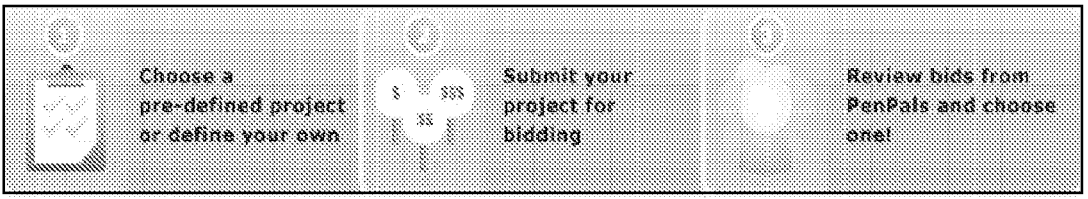
Figure 6:
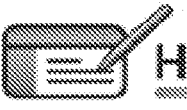

Consider an example where a user 201 and multiple consultants register on a host website, thereby creating a virtual service marketplace. The registration enables the user 201 and the consultants to access the online tools on the host website. An entry page of the host website greets the user 201 and the consultants as illustrated in FIG. 3 and FIG. 4. The entry page highlights the services provided to users and the job profile of the consultants. The user 201 may register for a project website of different types as illustrated in FIG. 5. The different types of the project website may be, for example, a basic site, a dynamic site, or a custom project. Before starting a project, the user 201 provides registration details, for example, e-mail, password, name, username, year of birth, etc., as illustrated in FIG. 6. FIG. 7 illustrates a webpage providing information about the consultants and how to register as a consultant.

Figure 8:
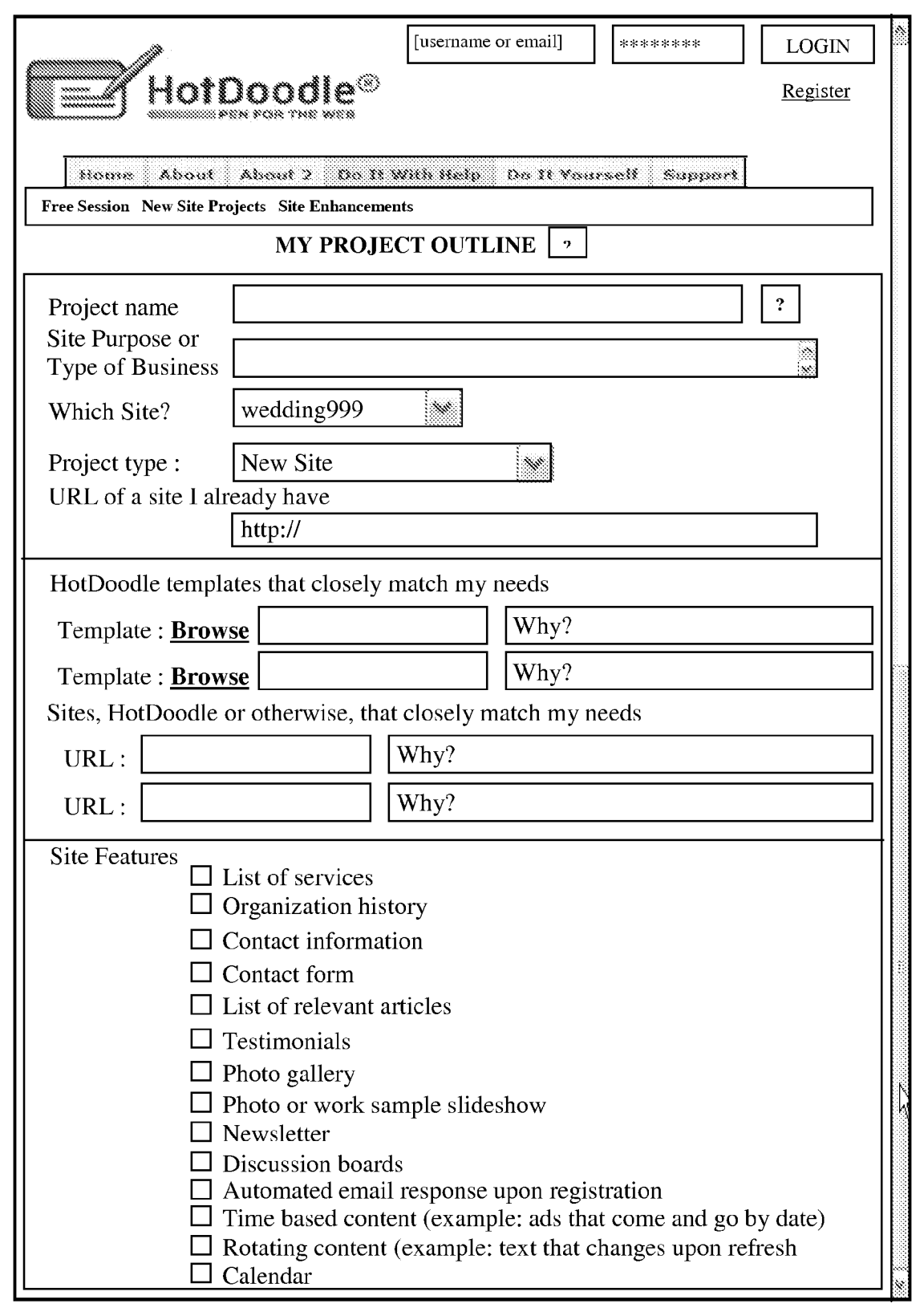
Figure 10:
Figure 12:
FIG. 12 exemplarily illustrates a project placed on hold prior to being proposed to the consultants for bidding on the host website.
Figure 13:
FIG. 13 exemplarily illustrates the status of a submitted project.

FIGS. 8-9 exemplarily illustrate definition of a project by the user 201. The user 201 may define the project by entering a description of the project, a due date and due time of bids for the project, and core controlling factors associated with the project. The core controlling factors may be, for example, operational preferences, payment schedule, and responses. The operational preferences may be, for example, the work location, the timeline, the rate per hour, etc. The payment schedule may be, for example, payment in full after the project is completed, before the project starts, progressive payments, etc. The user 201 may start with a blank project or a project based on a selected package of a project consultant 202. The user 201 may define a basic project website and provide preferences as illustrated in FIGS. 10-11. The user 201 may propose the project to multiple consultants in the virtual service marketplace to create the project website. The project may be placed on hold until the user 201 is ready to propose the project to the consultants for bidding, as illustrated in FIG. 12. Once the project is proposed, the user 201 may see the status of the submitted project as illustrated in FIG. 13.

Figure 14:
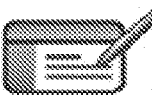
FIG. 14 exemplarily illustrates a list of available projects for viewing by the user on the host website.
Figure 15:
Figure 16:

The consultants may browse a list of available projects and may view the description of the projects as illustrated in FIG. 14. The consultants may choose to bid for a particular project and may change the core controlling factors of the proposed project. FIGS. 15-17 illustrate webpages for bidding on the proposed project by the consultants. FIG. 18 illustrates the webpage visible to the user 201 when there are bids on the proposed project. The consultants may differ in quality, bids, due date and due time of bids, etc, for example, "penpal55" and "Vivek Rau" are consultants who differ in rank, hourly rate, etc. The user 201 may select a project consultant 202 by clicking on "accept this bid and reject other bids". The project consultant 202 of the accepted bid will be selected if the user 201 accepts the terms set by the project consultant 202 as illustrated in FIG. 19. The user 201 may also receive a bid acceptance confirmation as illustrated in FIG. 20.

Figure 21:
Figure 23:
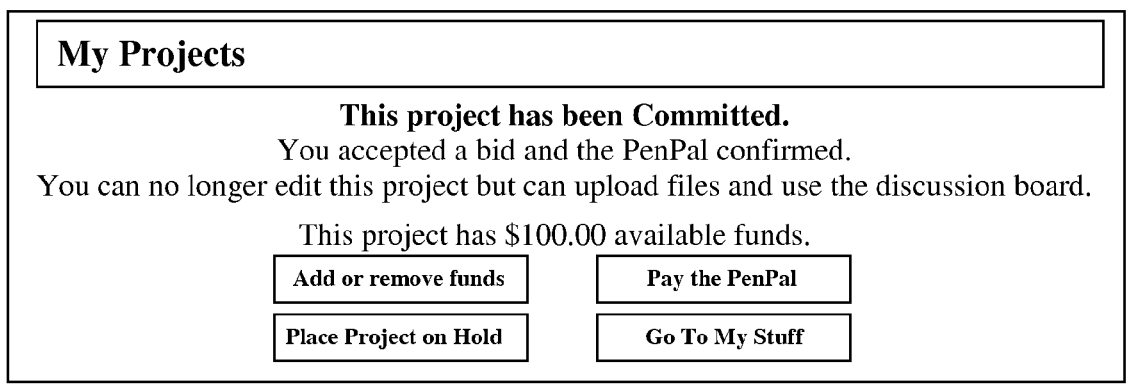
FIG. 23 exemplarily illustrates a message sent to the user after the consultant has committed to a project.
Figure 24:
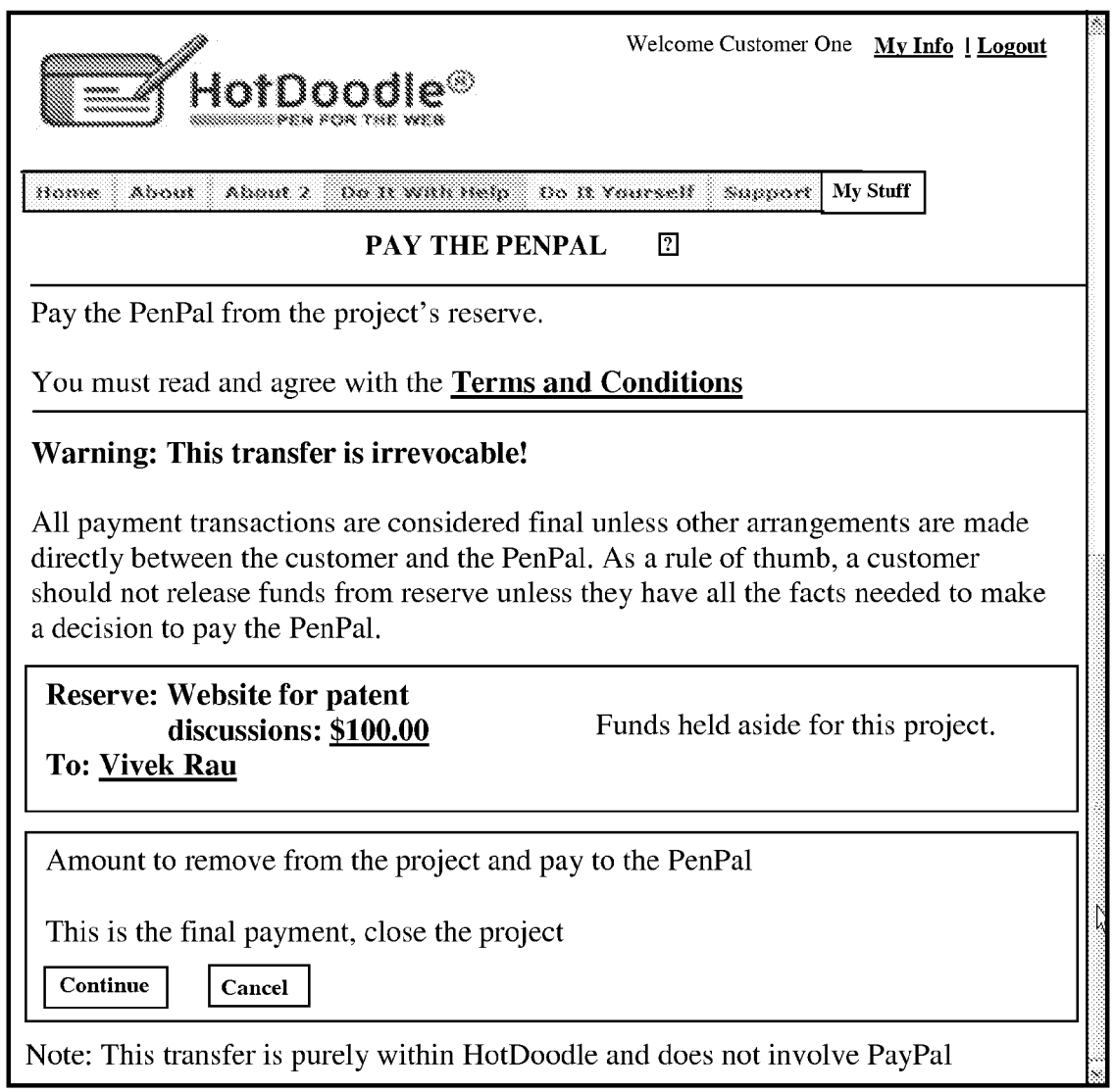
Figure 27:

After the user 201 selects the project consultant 202, the project consultant 202 sees the winning bid as illustrated in FIG. 21 and commits to completing the project according to the core controlling factors as illustrated in FIG. 22. If the project consultant 202 commits to completing the project, the user 201 may see a message as illustrated in FIG. 23. The project consultant 202 may then create the project website using the online tools provided on the host website. The user 201 may then pay the project consultant 202 using an electronic transfer of funds as illustrated in FIG. 24 and FIG. 25. The payment made by the user 201 for the project website is visible to the project consultant 202 as illustrated in FIG. 26. The project consultant 202 may also view the transactions regarding general funds of the projects as illustrated in FIG. 27.

Figure 31:
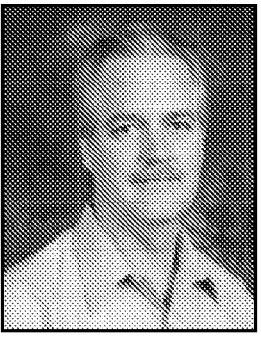
Figures 33, 34:
Figures 36, 37:
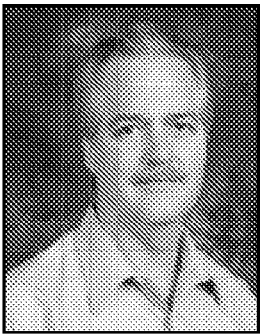

Consider an example where the user 201 and multiple consultants register on a host website, thereby creating a virtual service marketplace. FIG. 28 illustrates a webpage that provides information to the consultants for registration as a consultant. A consultant may register by providing details as illustrated in FIG. 29. The consultant may create a new profile as illustrated in FIG. 30. Once the profile is created and saved, a webpage as illustrated in FIG. 31 may be viewed where the consultant may click on "submit your profile for approval" to get the profile approved. The consultant, "A pen Pal" may add portfolios in the profile view as illustrated in FIG. 32 and FIG. 33. An exemplary portfolio is illustrated in FIG. 34. FIG. 35 exemplarily illustrates a larger portfolio of a consultant. Every consultant profile is screened for approval, and may have a review pending as illustrated in FIG. 36, by the host website system administrators.

Figure 38:
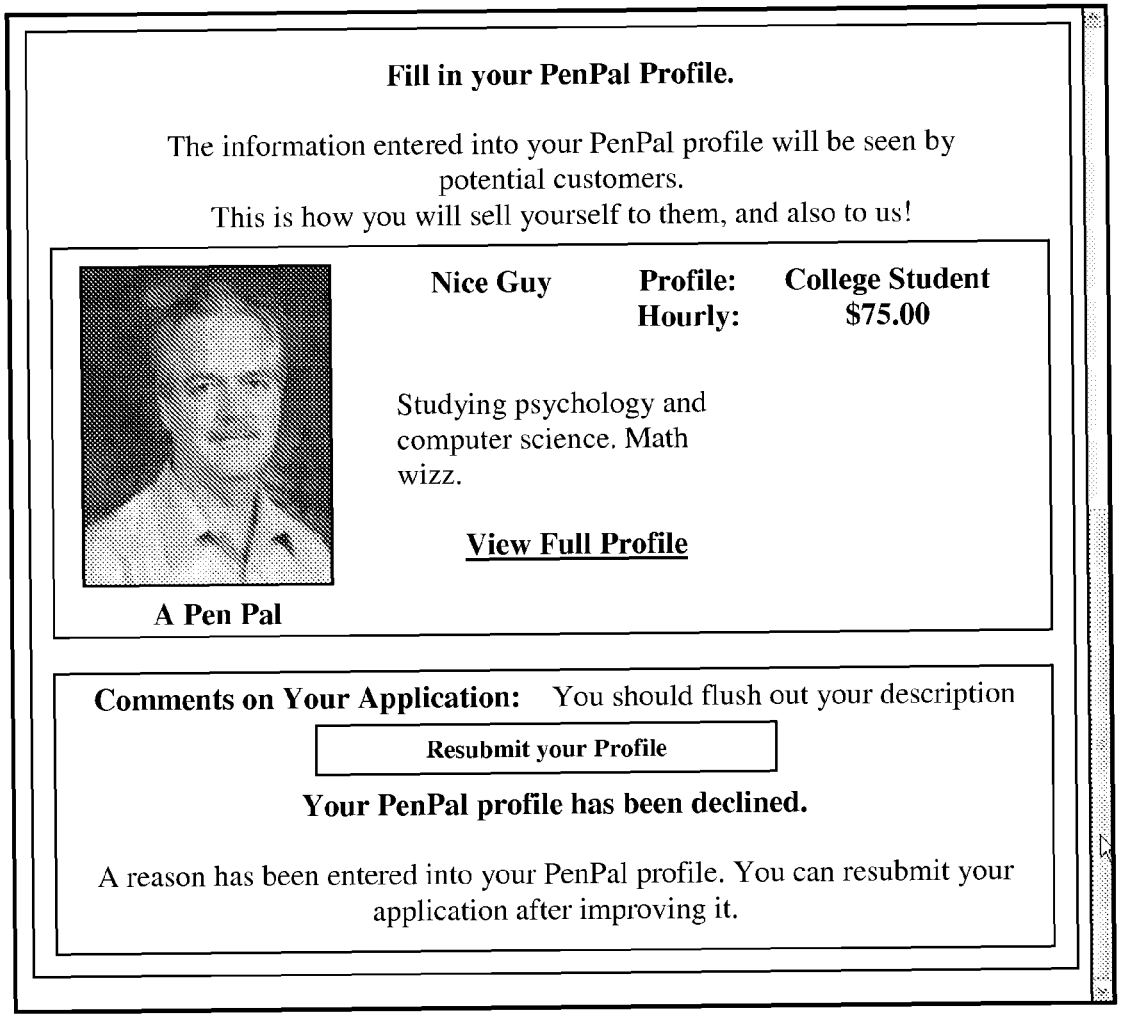
Figure 39:
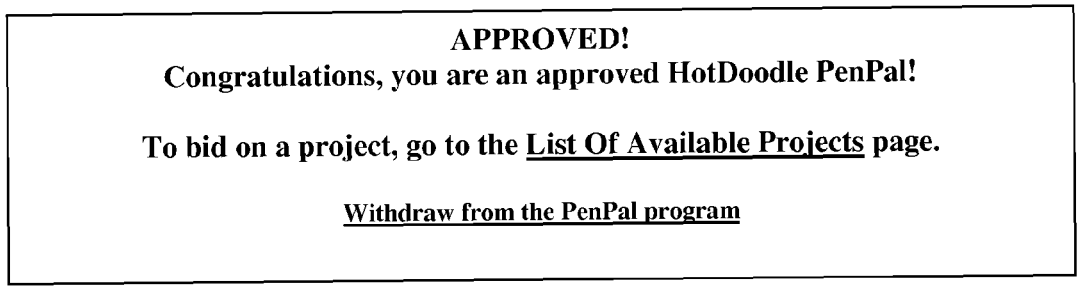

The consultant applications need to be approved in order to avoid unqualified consultants. The system administrators may also select a status in the profile of the consultant, for example, interested, pending, approved, denied, rejected, and withdrawn. Rank, feedback, and approval comments may also be added to the status as illustrated in FIG. 37. If the consultant has been denied or the profile declined, as illustrated in FIG. 38, the consultant may try again after improving the profile. However, if the consultant has been rejected, the consultant will not be allowed to try again. If the consultant is approved, the consultant may receive a message of approval as illustrated in FIG. 39. When a new project needs to be created, the consultant may click on "create a new predefined project from scratch" as illustrated in FIG. 40.

Figure 49:

FIGS. 41-42 exemplarily illustrate the definition of the project by the consultant. FIG. 43 illustrates the profile of the consultant once the project definition is saved. The users and other consultants may view a list of the consultants as illustrated in FIG. 44. If the profile of any consultant is opened, the projects created and supported by the particular consultant may be viewed by clicking on "view or use this project" of "predefined projects I have authored" and "other predefined projects I support" as illustrated in FIG. 45. FIG. 46 and FIG. 47 illustrate the sharing of packages of the consultant. The consultant may also choose to change payment, timeline, etc. When users look at packages of the consultants, a list of consultants supporting the particular project is also visible as illustrated in FIG. 48. FIG. 49 exemplarily illustrates the sharing of the packages of the consultant to increase visibility. The user 201 may also become an independent consultant as illustrated in FIG. 50. FIG. 51 illustrates an invitation for bidding sent to the project consultant 202 by the user 201.

Figure 52:
FIG. 52 exemplarily illustrates a webpage for allowing the user to enter feedback on the consultant.
Figure 53:
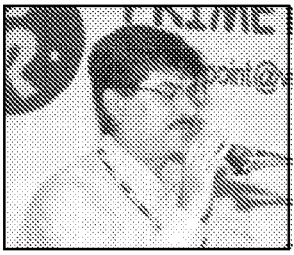
FIG. 53 exemplarily illustrates a webpage for entering feedback on a consultant.

FIG. 52 exemplarily illustrates a webpage for allowing the user 201 to enter feedback on the consultant. The user 201 may enter feedback on a particular consultant by clicking on "enter feedback on this PenPal" present on a winning bid webpage of the consultant as exemplarily illustrated in FIG. 52. FIG. 53 exemplarily illustrates a webpage for entering feedback on a consultant. The list of consultants with feedback, ranking, and reviews is exemplarily illustrated in FIG. 54. The user 201 may click on "reviews" illustrated in FIG. 54 to obtain a detailed review provided by the user 201. For example, the user 201 may click on "2 reviews" of consultant "Vivek Rau" illustrated in FIG. 54. FIG. 55 exemplarily illustrates the reviews provided to consultants by two users. The detailed reviews on Vivek Rau are listed as illustrated in FIG. 55.

It will be readily apparent that the various methods and algorithms described herein may be implemented in a computer readable medium appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hardwired circuitry or custom hardware may be used in place of, or in combination with, software instructions for implementation of the processes of various embodiments. Thus, embodiments are not limited to any specific combination of hardware and software. A "processor" means any one or more microprocessors, Central Processing Unit (CPU) devices, computing devices, microcontrollers, digital signal processors or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product comprising computer executable instructions embodied in a computer-readable medium comprises computer parsable codes for the implementation of the processes of various embodiments.

Where databases are described such as the database 203d, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A computer implemented method for electronic commerce applications, said computer implemented method comprising:

promoting a web technology through a virtual service marketplace on a host website, comprising:

providing a computing system comprising one or more processors, wherein said host website resides on said computing system;

providing a website creation application comprising a plurality of templates on said host website, wherein said host website further comprises online tools and a graphical user interface to create a project website using said website creation application, wherein the host website comprises said virtual service marketplace;

defining a project by a user, wherein said project definition comprises a description of said project, a due date and due time of bids for the project, and core controlling factors associated with the project, wherein said user is provided with funds comprising user general fund and user project fund;

displaying status of a plurality of consultants and consultant profiles on the host website, wherein said consultant profiles are screened by a system administrator of said host website, and wherein said system administrator selects said status of the consultants based on said screening of said consultant profiles;

proposing said defined project by said user to said plurality of consultants in the virtual service marketplace to create said project website and transferring said funds from said user general fund to said user project fund, wherein said user general fund and said user project fund are displayed along with the project definition, wherein transferring said funds provides an initiation amount for said proposed project, and wherein said project fund represents actual funds available for the project;

displaying said initiation amount available in said user project fund to said project consultants;

enabling said plurality of consultants to set and/or modify said core controlling factors associated with the project and bidding for said proposed project by one or more of said consultants in the virtual service marketplace;

synchronizing said core controlling factors set by the user for the defined project with core controlling factors set by the consultants;

accepting the set core controlling factors and the bids placed by one or more of the plurality of consultants associated with the project if the core controlling factors set by the one or more of the plurality of consultants are identical to the core controlling factors set by the user;

selecting a project consultant from the plurality of consultants by the user, wherein said project consultant is selected based on said synchronization and said acceptance by the user;

creating the project website by the selected project consultant using said website creation application, said templates, and said online tools on the host website; and paying the selected project consultant at progressive intervals of time during the due time by the user for creating the project website;

whereby said creation of the project website through the virtual service marketplace using the online tools promotes said web technology on the host website.

2. The computer implemented method of claim 1, wherein the user and the consultants register with the host website to create the virtual service marketplace and to gain access to the online tools.

3. The computer implemented method of claim 1, wherein the project website is one of an interactive website, a business website, a gaming website, a news website, a shopping website, and a social networking website.

4. The computer implemented method of claim 1, wherein the online tools on the host website are used to modify and enhance one of said created project website and a pre-existing project website.

5. The computer implemented method of claim 1, wherein said core controlling factors associated with the project comprise a pricing model for the project, turnaround time, a payment plan, payment details, and said initiation amount placed in said user project fund.

6. The computer implemented method of claim 1, further comprising the step of enabling the user to become an independent project consultant and seek businesses to draw more users to the host website, thereby promoting the host website through the virtual service marketplace.

7. The computer implemented method of claim 1, further comprising the step of creating the project website by the user using the online tools of the host website.

8. The computer implemented method of claim 1, wherein said step of paying the selected project consultant comprises generating a commission for the host website.

9. The computer implemented method of claim 1, wherein the consultants create packages comprising descriptions of example projects and core controlling factors associated with said example projects.

10. The computer implemented method of claim 9, wherein said packages are shared between the consultants to establish the virtual service marketplace of variants of particular packages and to increase visibility of the packages on the host website.

11. The computer implemented method of claim 1, wherein said graphical user interface presents check boxes to the user for each of one or more non-identical core controlling factors set by the consultants, wherein one or more of the core controlling factors set by the user are synchronized to said one or more non-identical core controlling factors set by the consultants when the user selects said check boxes on the graphical user interface.

12. The computer implemented method of claim 1, further comprising the step of notifying the user and the consultants of bids, changes in the core controlling factors, and status of the creation of the project website.

13. A computer implemented system for promoting a web technology through a virtual service marketplace on a host website, comprising:

a computing system comprising one or more processors, said computing system further comprising:

said host website, wherein said host website comprise a website creation application comprising a plurality of templates;

a graphical user interface provided on said host website comprising online tools for creating a project website, said graphical user interface displays status of a plurality of consultants and consultant profiles on the host website, wherein said consultant profiles are screened by a system administrator of said host website, and wherein said system administrator selects said status of the consultants based on said screening of said consultant profiles;

a project generation module comprising:

a project definition module for enabling a user to define a project and to propose said defined project to said plurality of consultants in said virtual service marketplace to create said project website, and said user is provided with funds comprising user general fund and user project fund;

a consultant selection module for enabling said user to select a project consultant from said consultants;

a project creation module for creating the project website by said selected project consultant using said online tools on the host website; and a payment and fund management module for enabling the user to transfer said funds from said user general fund to said user project fund, wherein said user general fund and said user project fund are displayed along with the project definition, wherein transferring said funds provides an initiation amount for said proposed project, wherein said payment and funds management module displays said initiation amount available in said user project fund to said project consultants, and wherein said payment and fund management module further enables the user to pay the selected project consultant for creating the project website;

a bidding system comprising:

a bid creation engine for enabling one or more of the consultants to set and/or modify said core controlling factors associated with the project and create bids for said proposed project in the virtual service marketplace; and a bid synchronization engine for synchronizing core controlling factors set by the user with core controlling factors set by the consultants for the proposed project.

14. The computer implemented system of claim 13, wherein said project definition comprises a description of said project, a due date and due time of bids for the project, and said core controlling factors associated with the project, wherein the core controlling factors comprise a pricing model for the project, turnaround time, a payment plan, payment details, and said initiation amount placed in said user project fund.

15. The computer implemented system of claim 13, wherein said payment and fund management module generates a commission for the host website.

16. The computer implemented system of claim 13, wherein said project generation module further comprises a package creation module for creating packages by the consultants, wherein said packages comprise descriptions of example projects and core controlling factors associated with said example projects.

17. The computer implemented system of claim 16, wherein said package creation module shares the packages between the consultants to establish the virtual service marketplace of variants of particular packages and to increase visibility of the packages on the host website.

18. The computer implemented system of claim 13, further comprising a registration module for registering the user and the consultants with the host website.

19. The computer implemented system of claim 13, wherein said project creation module enables the user to create the project website using the online tools of the host web site.

20. The computer implemented system of claim 13, further comprising a listing module for listing the consultants in the virtual service marketplace along with the expertise and qualifications of the consultants.

21. The computer implemented system of claim 20, wherein said listing module lists status of the consultants and consultant applications on the host website.

22. The computer implemented system of claim 13, further comprising a notification engine for notifying the user and the consultants of bids, changes in said core controlling factors, and status of said creation of the project website.

23. The computer implemented system of claim 13, wherein said project generation module further comprises a feedback and ranking engine for providing feedback on the consultants by the user and ranking the consultants based on created project websites.

24. The computer implemented system of claim 13, further comprising a database for storing a list of users, a list of the consultants, profiles of said users, profiles of the consultants, a list of projects defined by the users, bid expiration dates of said projects, said core controlling factors of the projects, wherein the core controlling factors comprise a pricing model for the projects, turnaround times, a payment plans, payment details, and initiation amount placed in project funds of the users, and a list of packages defined by the consultants.

25. A computer program product comprising computer executable instructions embodied in a non-transitory computer-readable medium, wherein said computer program product comprises:
   a first computer parsable program code for providing a website creation application comprising a plurality of templates on said host website, wherein said host website further comprises online tools and a graphical user interface to create a project website using said website creation application, wherein said host website comprises a virtual service marketplace;
   a second computer parsable program code for a graphical user interface for enabling a user to define a project, wherein said project definition comprises a description of said project, a due date and due time of bids for the project, and core controlling factors associated with the project, and said user is provided with funds comprising user general fund and user project fund;
   a third computer parsable program code for displaying status of a plurality of consultants and consultant profiles on the host website, wherein said consultant profiles are screened by a system administrator of said host website, and wherein said system administrator selects said status of the consultants based on said screening of said consultant profiles;
   a fourth computer parsable program code for enabling said user to propose said defined project to a plurality of consultants in said virtual service marketplace to create said project website and transferring said funds from said user general fund to said user project fund, wherein said user general fund and said user project fund are displayed along with the project definition, wherein transferring said funds provides an initiation amount for said defined project, wherein said project fund represents actual funds available for the project;
   a fifth computer parsable program code for displaying said initiation amount available in said user project fund to said project consultants;
   a sixth computer parsable program code for enabling one or more of said consultants to set and/or modify said core controlling factors associated with the project and bid for said proposed project in the virtual service marketplace;
   a seventh computer parsable program code for synchronizing said core controlling factors set by the user for the defined project with core controlling factors set by the consultants;
   an eighth computer parsable program code for enabling the user to select a project consultant from the consultants based on said synchronization;
   a ninth computer parsable program code for allowing said selected project consultant to create the project website using said website creation application, said templates, and said online tools on the host website; and
   a tenth computer parsable program code for paying the selected project consultant for creating the project website.

26. A computer implemented method of promoting a web technology through a virtual service marketplace on a host website, comprising:
   providing a computing system comprising one or more processors, wherein said host website resides on said computing system;
   providing a website creation application comprising a plurality of templates on said host website, wherein said host website further comprises online tools and a graphical user interface to create a project website using said website creation application, wherein the host website comprises said virtual service marketplace;
   defining a project by a user, wherein said user is provided with funds comprising user general fund and user project fund;
   displaying status of a plurality of consultants and consultant profiles on the host website, wherein said consultant profiles are screened by a system administrator of said host website, and wherein said system administrator selects said status of the consultants based on said screening of said consultant profiles;
   proposing said defined project by said user to said plurality of consultants in the virtual service marketplace to create said project website and transferring said funds from said user general fund to said user project fund, wherein said user general fund and said user project fund are displayed along with the project definition, wherein transferring said funds provides an initiation amount for said proposed project, wherein said project fund represents actual funds available for the project;
   displaying a view of said initiation amount available in said user project fund to said project consultants;
   enabling said plurality of consultants to set and/or modify said core controlling factors associated with the project and bidding for said proposed project by one or more of said consultants in the virtual service marketplace;
   selecting a project consultant from the consultants by the user;

creating the project website by the selected project consultant using said website creation application, said templates, and said online tools on the host website; and paying the selected project consultant by the user for creating the project website;

whereby said creation of the project website through the virtual service marketplace using the online tools promotes said web technology on the host website.

27. The computer implemented system of claim 18, wherein the registration module is configured to enable the users and the consultants to create a virtual service marketplace.

28. The computer implemented method of claim 1, wherein the user general fund can be used for the payments toward the utility of system services.

* * * * *